US012030689B1

(12) United States Patent
Yancho et al.

(10) Patent No.: US 12,030,689 B1
(45) Date of Patent: Jul. 9, 2024

(54) DEFORMABLE ITEM STABILIZER TRAY

(71) Applicant: Amazon Technologies, Inc., Seattle, WA (US)

(72) Inventors: Benjamin Yancho, Seattle, WA (US); George M. Varghese, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 17/488,843

(22) Filed: Sep. 29, 2021

(51) Int. Cl.
| | | |
|---|---|---|
| *B65D 1/40* | (2006.01) | |
| *B65B 5/04* | (2006.01) | |
| *B65D 1/34* | (2006.01) | |
| *B65D 81/05* | (2006.01) | |
| *B65G 47/00* | (2006.01) | |

(52) U.S. Cl.
CPC ............ *B65D 1/40* (2013.01); *B65B 5/04* (2013.01); *B65D 1/34* (2013.01); *B65D 81/05* (2013.01); *B65G 47/00* (2013.01); *B65G 2201/0258* (2013.01)

(58) Field of Classification Search
CPC ... B65D 1/40; B65D 1/34; B65D 1/36; B65D 81/05; B65G 47/00; B65G 2201/0258; B65B 5/04; B65B 5/00
USPC .............. 206/557, 564, 565, 562; 220/574, 220/495.03, 558, 62.13, 62.19, 676; 229/120.012, 117.13
See application file for complete search history.

(56) References Cited

U.S. PATENT DOCUMENTS

| | | | | |
|---|---|---|---|---|
| 3,403,837 | A * | 10/1968 | Farquhar ................ | B65D 5/563 229/905 |
| 4,905,836 | A * | 3/1990 | Lindgren ................ | B64D 1/16 220/9.1 |
| 2004/0026017 | A1* | 2/2004 | Taylor ................ | B41M 5/38207 156/240 |
| 2008/0164175 | A1* | 7/2008 | Meissen ............... | B65D 21/062 206/509 |
| 2013/0260106 | A1* | 10/2013 | Bohrer .................... | B32B 27/36 428/534 |
| 2013/0292393 | A1* | 11/2013 | Doherty ............... | B65D 25/103 220/675 |
| 2015/0353255 | A1* | 12/2015 | Cheung .............. | B65D 77/0433 206/557 |
| 2018/0022529 | A1* | 1/2018 | Tye ........................ | B65D 5/563 206/557 |
| 2021/0078754 | A1* | 3/2021 | Rosi ....................... | B65D 85/34 |
| 2021/0086942 | A1* | 3/2021 | Enguix Nicolás .... | B29C 51/165 |

* cited by examiner

*Primary Examiner* — Rafael A Ortiz
(74) *Attorney, Agent, or Firm* — Thomas | Horstemeyer, LLP

(57) ABSTRACT

A deformable item stabilizer tray is described for stabilizing an item during conveyance and transport. The deformable item stabilizer tray includes a base adapted to support an article and a plurality of sidewalls surrounding and extending at an angle from the base. A first notched-out region in a first one of the sidewalls defines a first lip support region having at least one indent configured to control a deformation of the lip above the first lip support region. A second notched-out region in a second one of the sidewalls defines a second lip support region having at least one indent configured to control a deformation of the lip above the second lip support region. The first notched-out region and the second notched-out region may be on opposite ones of the sidewalls.

20 Claims, 10 Drawing Sheets

DEFORMABLE ITEM STABILIZER TRAY

BACKGROUND

Modern fulfillment centers, warehouses, and the like handle an enormous number of commercial products of various shapes and sizes. Conveyors and other transport systems are often utilized to transport items from one location of a facility to another, process an item for shipment to a purchaser, and so forth. Some conveyors and similar systems perform short movements or intermediary stops that impose various forces on the items. Generally, cylindrical and other rollable items are not stable and do not perform well on conveyors as, when an intermediary stop occurs, momentum can cause the cylindrical items to roll on the conveyor. This tends to create slowdowns in item fulfillment. As such, items that roll or rock out of position can be detrimental to handling and packaging operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, other features may be omitted or simplified in order not to obscure the embodiment being described.

Conveyors and other transport systems are often utilized to transport items from one location of a facility to another, process an item for shipment to a purchaser, and so forth. Some conveyors and similar systems perform short movements or intermediary stops that impose various forces on the items. Cylindrical and other rollable items do not perform well as, when an intermediary stop occurs, momentum causes cylindrical and circular-shaped items to roll on the conveyor. This tends to create slowdowns in item fulfillment. As such, items that roll or rock out of position can be detrimental to the operation of the handling and packaging functions.

According to various embodiments, an item stabilizer tray is described that may be used to stabilize round, cylindrical, unstable, or other desired items during conveyance in a materials handling process. To this end, the item stabilizer tray may ensure that traditionally unstable items will stay fixed even in situations in which lateral or horizontal forces are imposed on the items, thereby preventing unintended motion during the materials handling process. As will be described, the item stabilizer tray may be designed to include a unique geometry having formed ribs, breakaway fingers, a shallow raised floor lip, and other components in order to accommodate a wide variety of items seen within the materials handling process and electronic commerce environments. In some embodiments, the item stabilizing tray may be composed of pulp paper or other suitable material that ensures a low unit cost while achieving curbside recyclability. In various embodiments, the item stabilizer tray may be scaled (e.g., to be larger or smaller) to accommodate a variety of different sized items.

Figure 1:
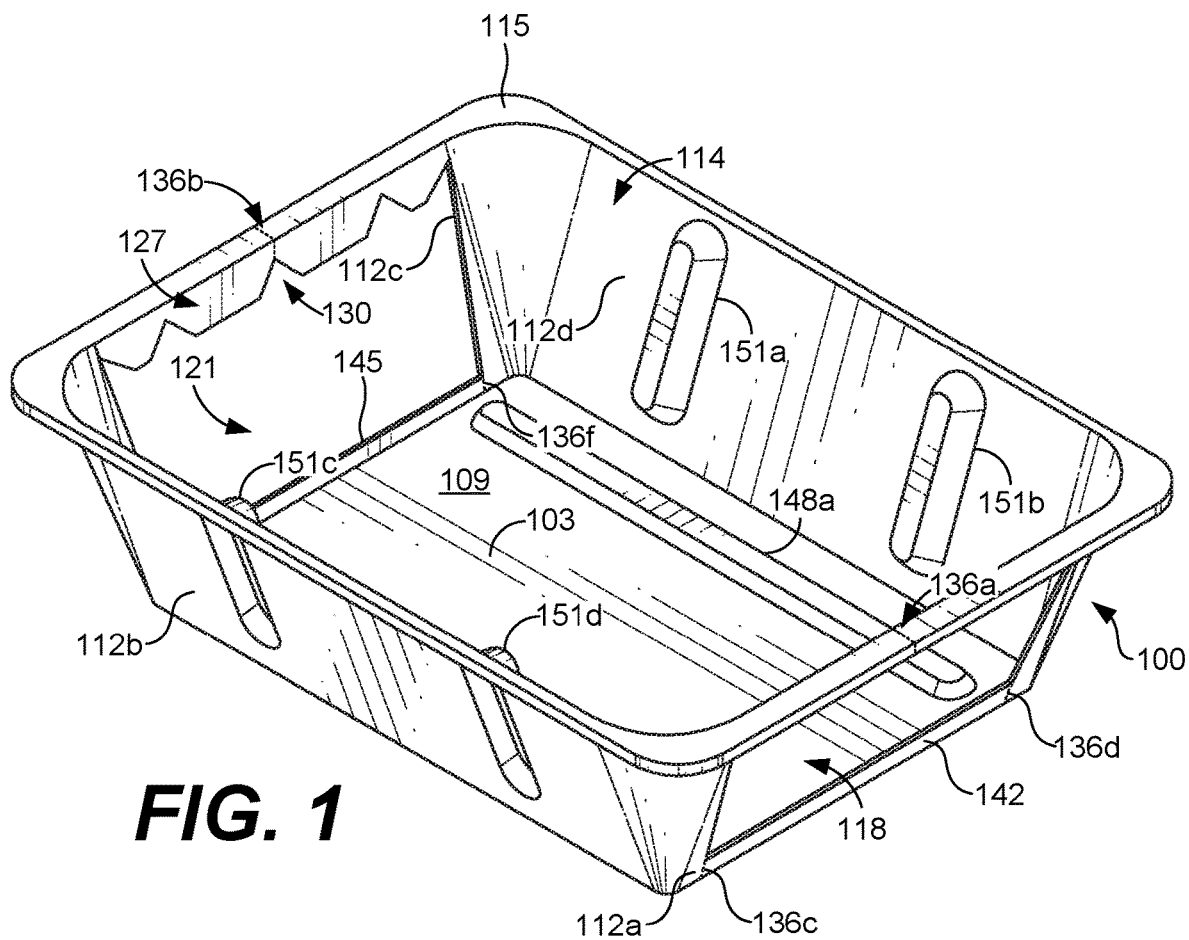
FIG. 1 is a top perspective view of a deformable item stabilizer tray in accordance with various embodiments of the present disclosure.
Figure 2:
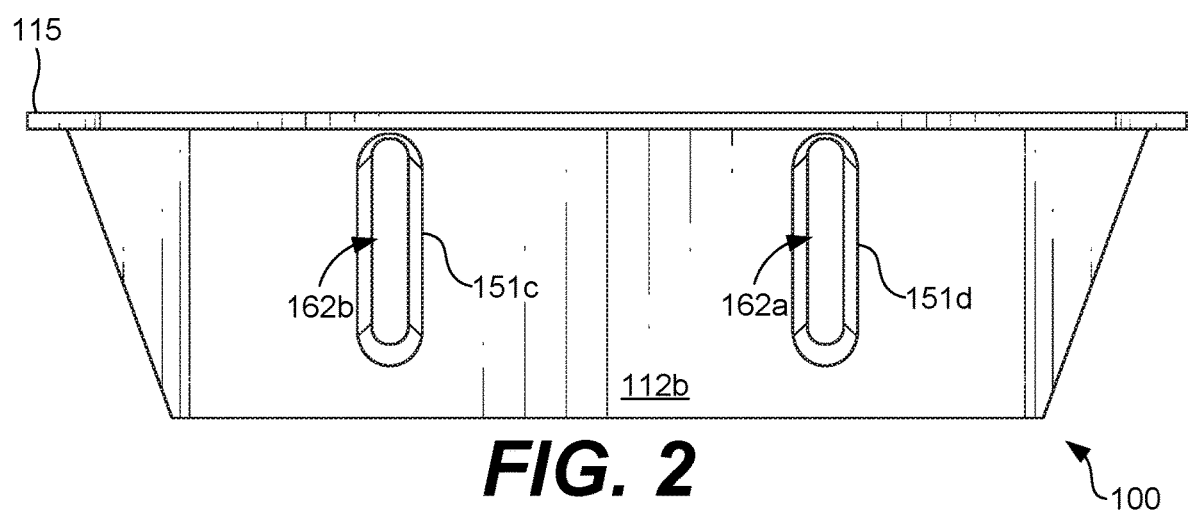
FIG. 2 is a side elevation view of the deformable item stabilizer tray of FIG. 1 in accordance with various embodiments of the present disclosure.
Figure 3:
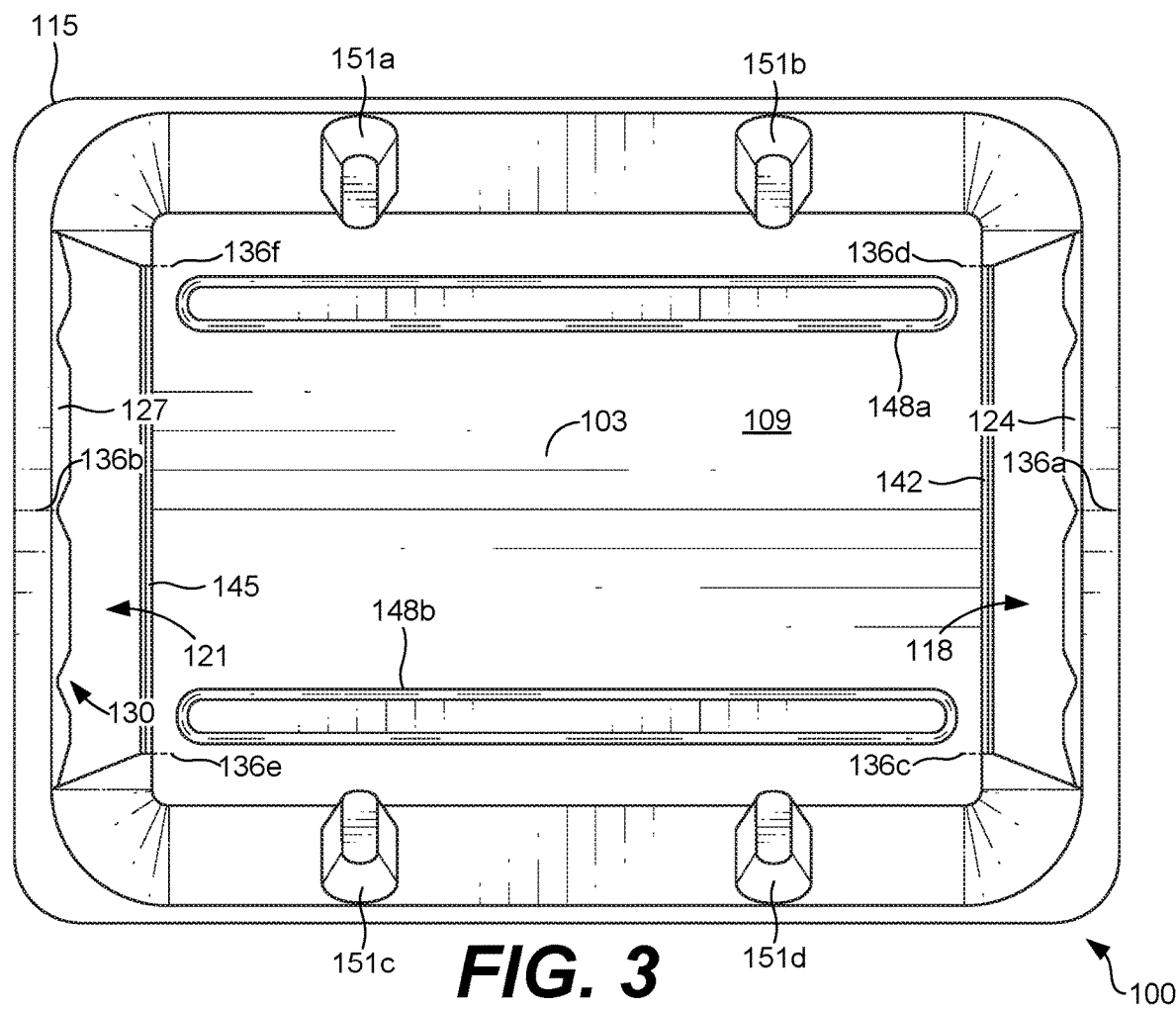
FIG. 3 is a top plan view of the deformable item stabilizer tray of FIG. 1 in accordance with various embodiments of the present disclosure.
Figure 4:
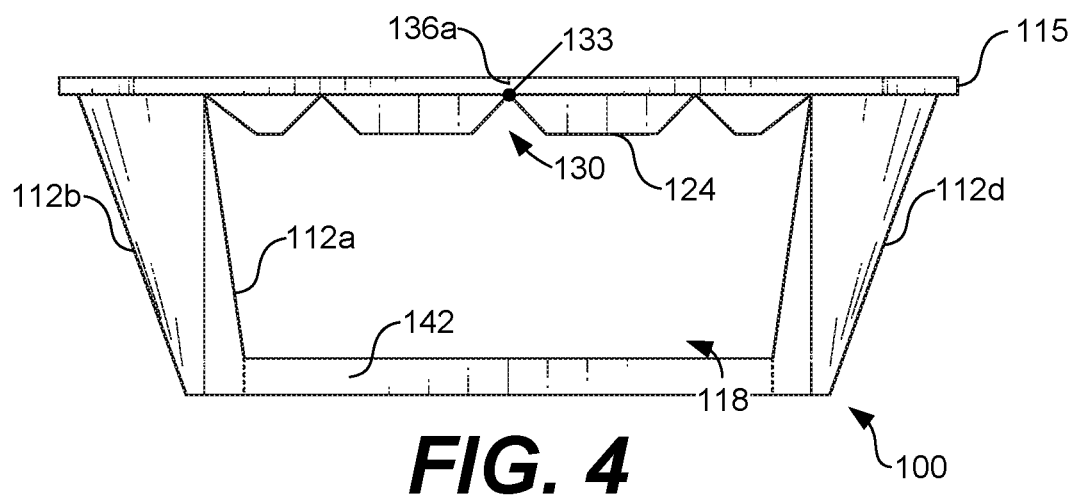
FIG. 4 is a front elevation view of the deformable item stabilizer tray of FIG. 1 in accordance with various embodiments of the present disclosure.
Figure 5:
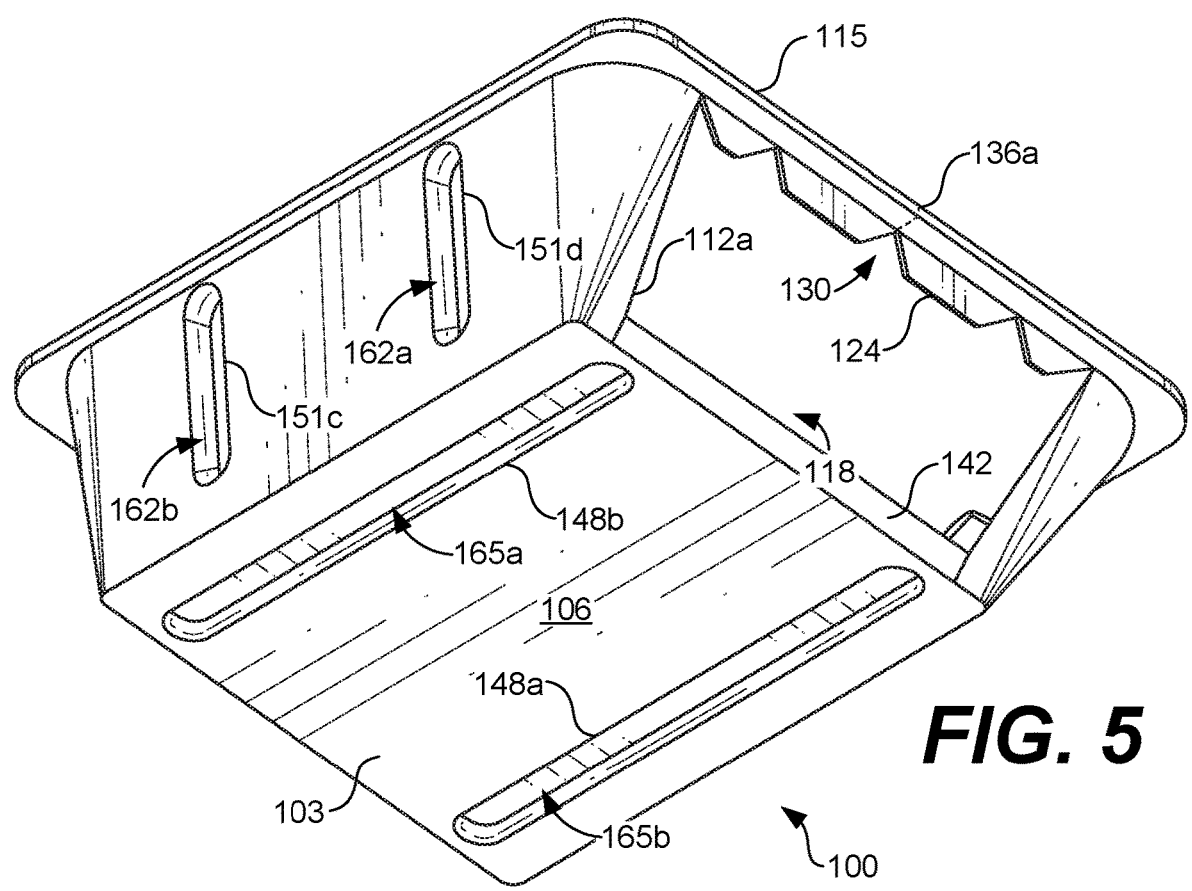
FIG. 5 is a bottom perspective view of the deformable item stabilizer tray of FIG. 1 in accordance with various embodiments of the present disclosure.

Referring now to FIGS. 1-5, various views of an item stabilizer tray 100 are shown according to various embodiments. In various embodiments, the item stabilizer tray 100, or portions thereof, may be intentionally deformable or collapsible. For instance, when an item having sufficient weight is placed on a respective area of the item stabilizer tray 100, a portion of the item stabilizer tray 100 may deform or collapse to establish a sufficient coupling between the item stabilizer tray 100 and the item, such that the item does not roll or rock when the item is subject to acceleration or deceleration, for instance, as the item is transported along a conveyor system or otherwise moved in a facility. More specifically, FIG. 1 is a top perspective view of the item stabilizer tray 100, FIG. 2 is a side elevation view of the item stabilizer tray 100, FIG. 3 is a top plan view of the item stabilizer tray 100, FIG. 4 is a front elevation view of the item stabilizer tray 100, and FIG. 5 is a bottom perspective view of the item stabilizer tray 100 in accordance with various embodiments of the present disclosure.

Referring among FIGS. 1-5, the item stabilizer tray 100 may include a base 103 adapted to support an article (not shown), such as a cylindrical item. For instance, a cylindrical item may include a protein powder container, beverage, bottled item, canned food, and the like. In some embodiments, the base 103 is rectangular-shaped and, as such, may be referred to as a rectangular base 103 or a generally elongated base 103 in some embodiments. It is understood that the base 103 may assume other shapes, such as a circle, triangle, or square in various embodiments. In some embodiments, the item stabilizer tray 100 is symmetrical.

In any event, the base 103 may include a bottom side contact surface 106 and a top side contact surface 109. The bottom side contact surface 106 may include a surface that contacts a conveyor surface. As such, the bottom side contact surface 106 may be configured to maintain friction with a conveyor or other item transport device. The bottom side contact surface 106 in some embodiments may have a coefficient of friction large enough to prevent the forces imposed by acceleration or deceleration of a conveyor system (e.g., from start and stop operations of a conveyor) from dislodging an item stored therein. In some embodiments, an adhesive or a material having a high coefficient of friction (e.g., rubber) may be attached to the bottom side contact surface 106.

Further, the item stabilizer tray 100 may include sidewalls 112a . . . 112d (collectively "sidewalls 112") surrounding and extending up from the base 103 defining a tray interior 114. In some embodiments, as shown in FIGS. 1-5, the sidewalls 112 extend vertically at an angle from the base 103 such that a width between bottoms of the sidewalls 112 adjacent to the base 103 is less than a width between tops of the sidewalls 112. To this end, in some embodiments, the angle α of projection of the sidewalls 112 is between 0° and 35°, such as approximately 0°, 5°, 10°, 15°, 20°, 25°, 30°, and 35°, and values therebetween, although other angles may be employed depending on the particular application and/or item to be transported. Further, one or more of the sidewalls 112 (e.g., two of the sidewalls 112) may be deformable or collapsible, as will be described.

The item stabilizer tray 100 further includes a lip 115 and, as such, the sidewalls 112 may contact or extend into the lip 115 in some embodiments. The sidewalls 112 be directly adjacent to the lip 115 in various embodiments. For instance, a top of the sidewalls 112 may couple directly to the lip 115 and/or may be formed integral with the lip 115. In alternative embodiments, a top of the sidewalls 112 may couple indirectly to the lip 115 meaning an intermediary space may exist between the sidewalls 112 and the lip 115. As shown in FIGS. 1-5, in some embodiments, the lip 115 may have an outer peripheral extent or, in other words, the lip 115 may project outwards from the sidewalls 112. It is understood that the outer peripheral extent may facilitate gripping the item stabilizer tray 100 using fingertips when the item stabilizer tray 100 is one of many item stabilizer trays 100 in a stack. However, in alternative embodiments, the lip 115 may have an inner and/or an outer peripheral extent, or may have no extent.

Moving along, in some embodiments, the item stabilizer tray 100 may include a first notched-out region 118 and a second notched-out region 121. The first notched-out region 118 and the second notched-out region 121 may be positioned on opposite ones of the sidewalls 112, such as, for example, a front sidewall 112a and a rear sidewall 112c. However, it is understood that in alternative embodiments, the first notched-out region 118 and the second notched-out region 121 may be positioned on a left sidewall 112b and a right sidewall 112d.

In further embodiments, the first notched-out region 118 may also be referred to as a first window area and the second notched-out region 121 may also be referred to as a second window area. Regardless, an item may be placed in the item stabilizer tray 100 and positioned, such that, a portion of the item is readable through the first notched-out region 118 and/or the second notched-out region 121. For example, the first notched-out region 118 and the second notched-out region 121 may be positioned in the sidewalls 112 such that a label of an item allows a scanner, imaging device, and/or sensor to detect the label.

In various embodiments, the first notched-out region 118 may be positioned in a first one of the sidewalls 112 such that the first notched-out region 118 defines a first lip support region 124. Similarly, the second notched-out region 121 may be positioned in a second one of the sidewalls 112 such that the second notched-out region 121 defines a second lip support region 127 on an opposing sidewall 112. The first lip support region 124 may be positioned directly below the lip 115, and may include a portion of material that supports a part of the lip 115 located above the first notched-out region 118. Likewise, the second lip support region 127 may be positioned directly below the lip 115, and may include a portion of material that supports a part of the lip 115 located above the second notched-out region 121.

In some embodiments, the first lip support region 124 has at least one indent configured to control a deformation of the lip 115 above the first lip support region 124, and the second lip support region 127 similarly has at least one indent configured to control a deformation of the lip above the second lip support region 127. For instance, the at least one indent may control how the lip 115, or portions thereof, collapse when an item having a sufficient size or weight is placed thereon. In some embodiments, as shown in FIGS. 1-5, the at least one indent of the first lip support region 124 and/or the at least one indent of the second lip support region 127 includes a multitude of triangular-shaped indents 130 or, in other words, a multitude of sawtooth indents. It is understood that various embodiments are not limited to these shapes.

The item stabilizer tray 100 may include various perforations 136a . . . 136f (collectively "perforations 136"). For instance, in embodiments in which the at least one indent of the first lip support region 124 and/or the at least one indent of the second lip support region 127 includes a multitude of triangular-shaped indents 130, a central one of the triangular-shaped indents 130 of the first lip support region 124 may have an apex 133 positioned directly underneath a first perforation 136a of the lip 115, and a central one of the triangular-shaped indents 130 of the second lip support region 127 may have an apex 133 (not shown) positioned directly underneath a second perforation 136b of the lip 115.

While this indents are shown in the figure as being triangular-shaped indents 130, it is understood that other geometries may be employed. For instance, circular-indents may be employed, as can be appreciated. Additionally, the indents may assume other shapes.

The perforations 136, such as the first perforation 136a and the second perforation 136b among others described herein, may include a multitude of small holes or cuts in a surface of the item stabilizer tray 100. For instance, in embodiments, in which the item stabilizer tray 100 is formed of pulp paper, the first perforation 136a and the second perforation 136b may include a multitude of small holes or cuts made in the pulp paper. To this end, when a sufficiently sized and weighted item is placed on the first perforation 136a and/or the second perforation 136b, the first perforation 136a and/or the second perforation 136b will tear and the portion of the lip 115 above the first notched-out region 118 and/or the second notched-out region 121 will collapse about a respective one of the perforations 136.

The intentional collapse is aided by the triangular-shaped indents 130 in the first lip support region 124 and the second lip support region 127. For instance, a collapsed portion of the lip 115 will then wrap around one or more sides of an item placed thereon, creating a sufficient coupling that prevents the item from being shifted when lateral forces are acted upon the item, such as when a conveyor conveying the item abruptly starts and/or abruptly stops.

In some embodiments, the first notched-out region 118 may further define a first notched-region base 142. The first notched-region base 142 may include a portion of material positioned underneath the first notched-out region 118 that contacts adjacent ones of the sidewalls 112 and/or the base 103. In some embodiments, the first notched-region base 142 may include a rectangular shape, although other shapes may be employed. Additionally, the first notched-region base 142 may include a third perforation 136c and a fourth perforation 136d. The third perforation 136c and the fourth perforation 136d may be located on opposing distal ends of the first notched-region base 142, for instance, at a location where the first notched-region base 142 contacts the sidewalls 112.

Likewise, the second notched-out region 121 may further define a second notched-region base 145. Like the first notched-region base 142, the second notched-region base 145 may include a portion of material positioned underneath the second notched-out region 121 that contacts adjacent ones of the sidewalls 112 and/or the base 103. In some embodiments, the second notched-region base 145 may include a rectangular shape, although other shapes may be employed. Also, the second notched-region base 145 may include a fifth perforation 136e and a sixth perforation 136f. The fifth perforation 136e and the sixth perforation 136f may be located on opposing distal ends of the second notched-region base 145, for instance, at a location where the second notched-region base 145 contacts the sidewalls 112.

The item stabilizer tray 100 may further include one or more ribs or, in other words, one or more base projections 148a, 148b (collectively "base projections 148") and/or sidewall projections 151a . . . 151d (collectively "sidewall projections 151"). Referring again to the base 103, in some embodiments, the base 103 may include a first base projection 148a and a second base projection 148b extending along a longitudinal axis of the base 103. The base projections 148 may be elongated, substantially traversing 80% to 90% along a length of the base 103, for example. However, it is understood that different percentages may be employed. As such, in some embodiments, the base projections 148 may be referred to as elongated base projections or base ribs. It is understood that the base projections 148 may facilitate retaining an item or storing an item therebetween. The base projections 148 may include a triangular or pyramidal shape, having curved sidewalls extending upwards and contacting a flat top surface of the base projections 148.

Referring now to the sidewalls 112, in various embodiments, ones of the sidewalls 112 not having a notched-out region (e.g., sidewalls 112 not having the first notched-out region 118 and the second notched-out region 121) may include sidewall projections 151. Assuming the first notched-out region 118 and the second notched-out region 121 are located on a front sidewall 112a and a rear sidewall 112c, respectively, the left and right sidewalls 112b, 112d may include sidewall projections 151. Like the base projections 148, the sidewall projections 151 may be elongated, substantially traversing 80% to 90% along a height of the sidewall 112 or, in other words, along a normal axis of respective ones of the sidewalls 112. However, it is understood that different percentages may be employed. As such, in some embodiments, the sidewall projections 151 may be referred to as elongated sidewall projections or sidewall ribs. It is understood that the sidewall projections 151 may further facilitate retaining an item or storing an item therebetween. The sidewall projections 151 may include a triangular or pyramidal shape, having curved sidewalls extending upwards and contacting a flat top surface of the sidewall projections 151.

As may be appreciated, due to the shape and size of the item stabilizer tray 100, it is understood that multiple ones of the item stabilizer tray 100 may be combined in a stack of item stabilizer trays 100. Referring specifically to FIG. 5, as the sidewall projections 151 of the item stabilizer tray 100 protrude inwards towards the tray interior 114, the sidewall projections 151 may define sidewall recesses 162a, 162b on outer surfaces of the sidewall 112. Likewise, the base projections 148 of the item stabilizer tray 100 protrude upwards towards the tray interior 114 and thus, define base recesses 165a, 165b on the bottom side contact surface of the base 103. It is understood that when multiple item stabilizer trays 100 are stacked, sidewall projections 151 of a first item stabilizer tray 100 may nest in sidewall recesses 162 of a second item stabilizer tray 100, and base projections 148 of the first item stabilizer tray 100 may nest in base recesses 165 of the second item stabilizer tray 100.

Figure 6:
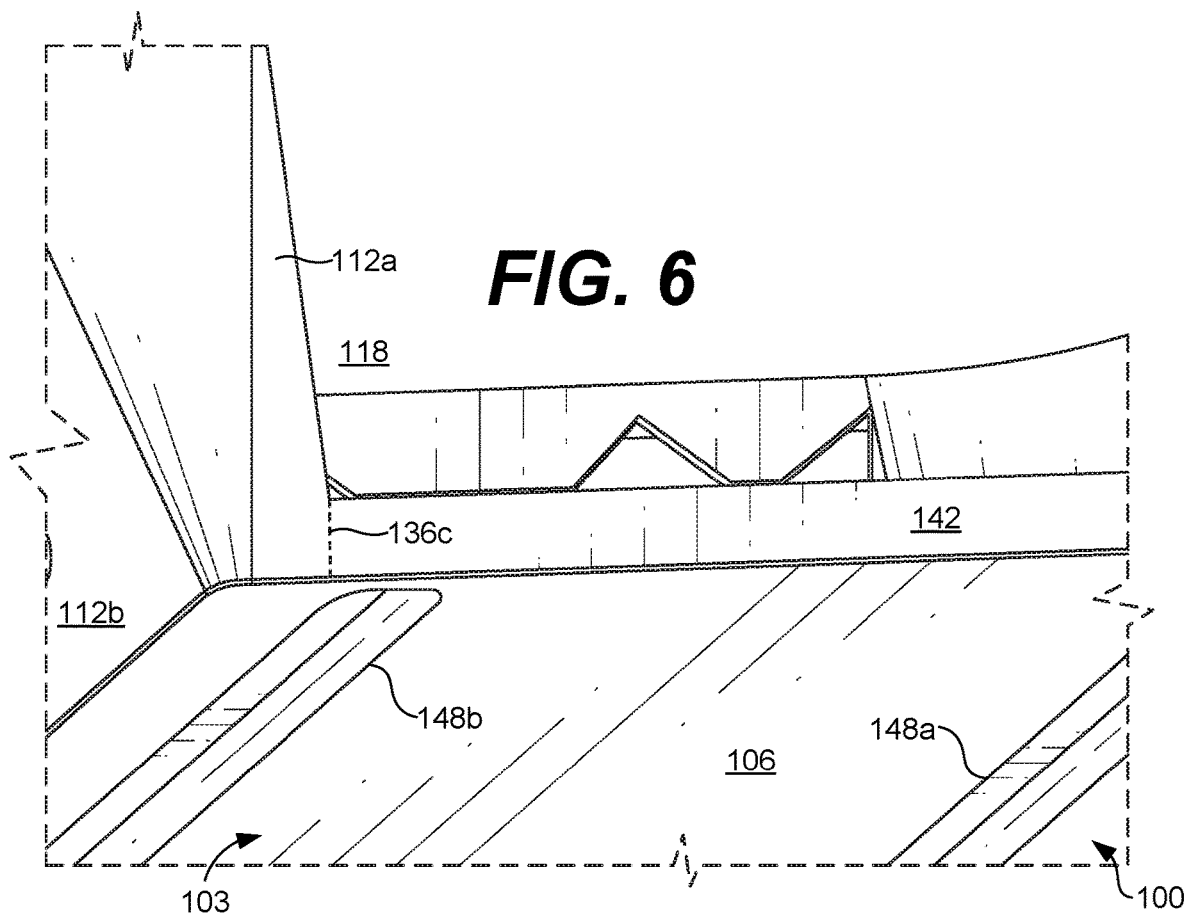
FIG. 6 is an enlarged perspective view of the deformable item stabilizer tray of FIG. 1 in accordance with various embodiments of the present disclosure.

Turning now to FIG. 6, an enlarged perspective view of the item stabilizer tray 100 of FIG. 1 is shown in accordance with various embodiments of the present disclosure. Specifically, FIG. 6 shows an enlarged perspective view of the first notched-region base 142. As noted above, the first notched-region base 142 may include a portion of material positioned underneath the first notched-out region 118 that contacts adjacent ones of the sidewalls 112 and/or the base 103. In some embodiments, the first notched-region base 142 may include a rectangular shape, although other shapes may be employed. Additionally, the first notched-region base 142 may include a third perforation 136c and a fourth perforation 136d. The third perforation 136c and the fourth perforation 136d (not shown) may be located on opposing distal ends of the first notched-region base 142, for instance, at a location where the first notched-region base 142 contacts the sidewalls 112.

Although not shown in FIG. 6, it is understood that the second notched-out region 121 may similarly define a second notched-region base 145. Like the first notched-region base 142, the second notched-region base 145 may include a portion of material positioned underneath the second notched-out region 121 that contacts adjacent ones of the sidewalls 112 and/or the base 103, shown in FIG. 1. In some embodiments, the second notched-region base 145 may include a rectangular shape, although other shapes may be employed. Also, the second notched-region base 145 may include a fifth perforation 136e and a sixth perforation 136f. The fifth perforation 136e and the sixth perforation 136f may be located on opposing distal ends of the second notched-region base 145, for instance, at a location where the second notched-region base 145 contacts the sidewalls 112.

Figure 7:
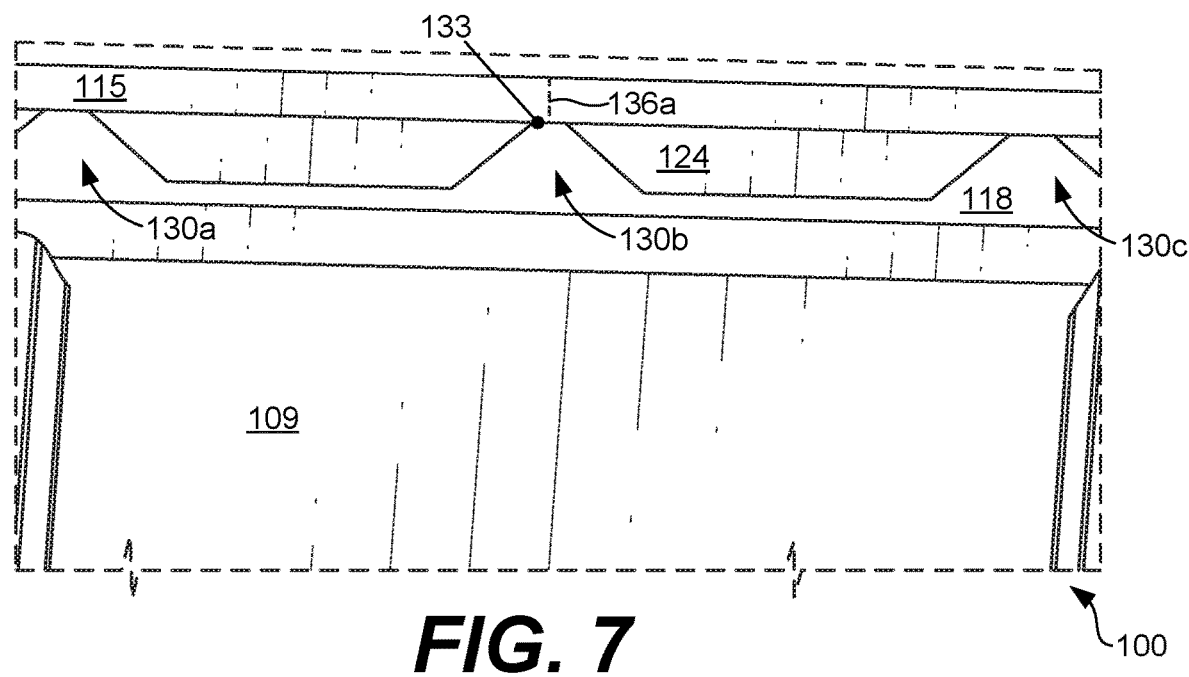
FIG. 7 is another enlarged perspective view of the deformable item stabilizer tray of FIG. 1 in accordance with various embodiments of the present disclosure.

Moving along to FIG. 7, another enlarged perspective view of the item stabilizer tray 100 of FIG. 1 is shown in accordance with various embodiments of the present disclosure. Specifically, FIG. 7 shows an enlarged perspective view of the at least one ident of the first lip support region 124 and the lip 115 positioned above. In embodiments in which the at least one indent of the first lip support region 124 includes a multitude of triangular-shaped indents 130a . . . 130c (collectively "triangular-shaped indents 130"), a central one of the triangular-shaped indents 130b of the first lip support region 124 may have an apex 133 positioned directly underneath a first perforation 136a of the lip 115. While embodiments described herein show three ones of the triangular-shaped idents 130, it is understood that the number of idents may include, one, two, four, five, and so forth.

Although not shown in FIG. 7, it is understood that, in embodiments in which the at least one indent of the second lip support region 127 includes a multitude of triangular-shaped indents 130 (collectively "triangular-shaped indents 130"), a central one of the triangular-shaped indents 130b of the second lip support region 127 may similarly have an apex 133 positioned directly underneath a second perforation 136b of the lip 115.

Figure 8:
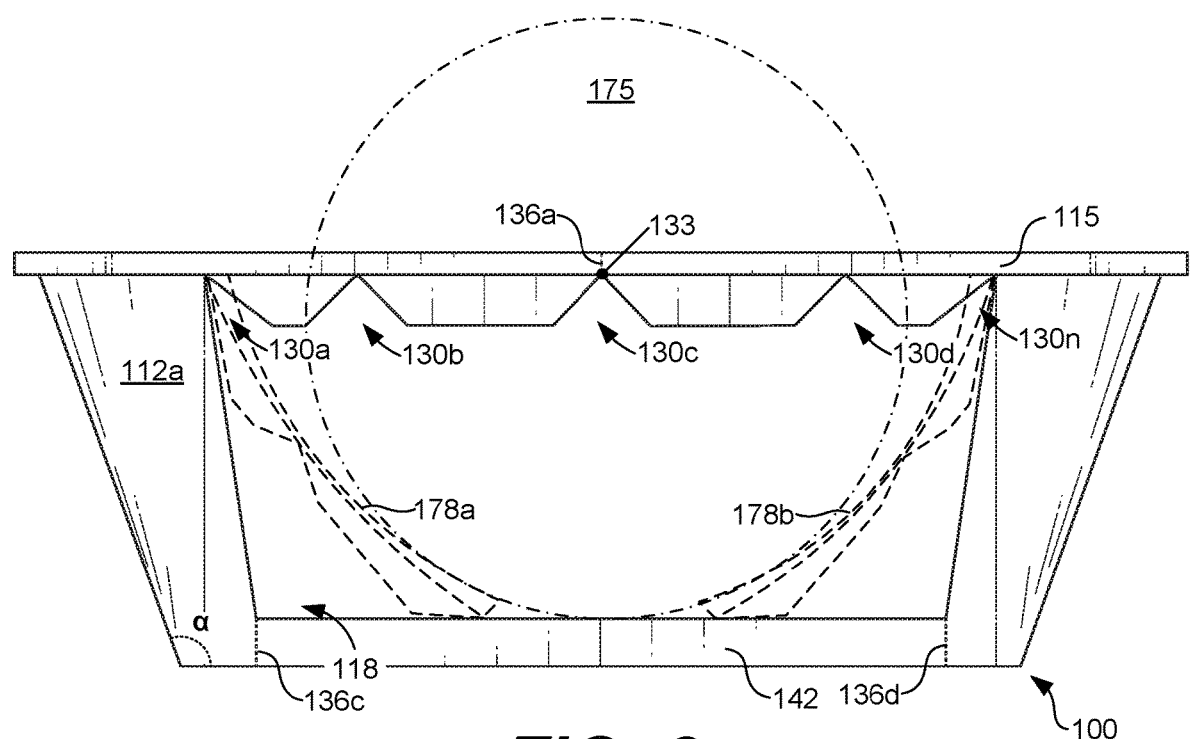
FIG. 8 is another front elevation view of the deformable item stabilizer tray of FIG. 1 showing an intentional separation of a lip into two members in accordance with various embodiments of the present disclosure.
Figure 9A:
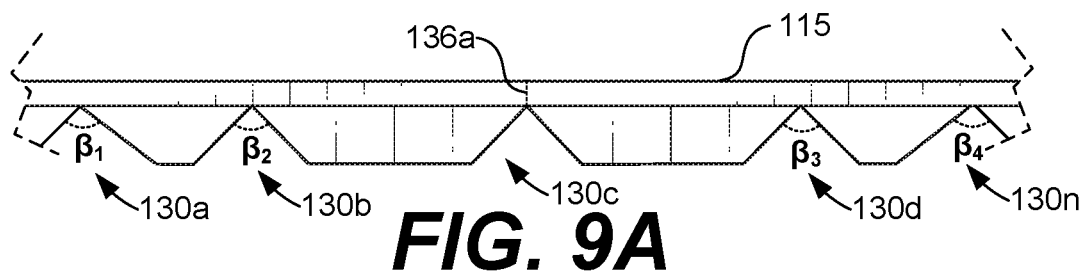
FIGS. 9A-9D are front elevation views of the deformable item stabilizer tray of FIG. 1 showing a controlled deformation of the lip in accordance with various embodiments of the present disclosure.
Figure 9B:
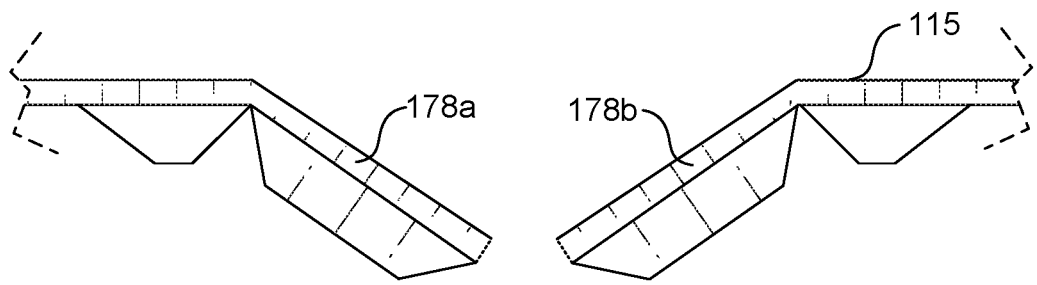
Figure 9C:
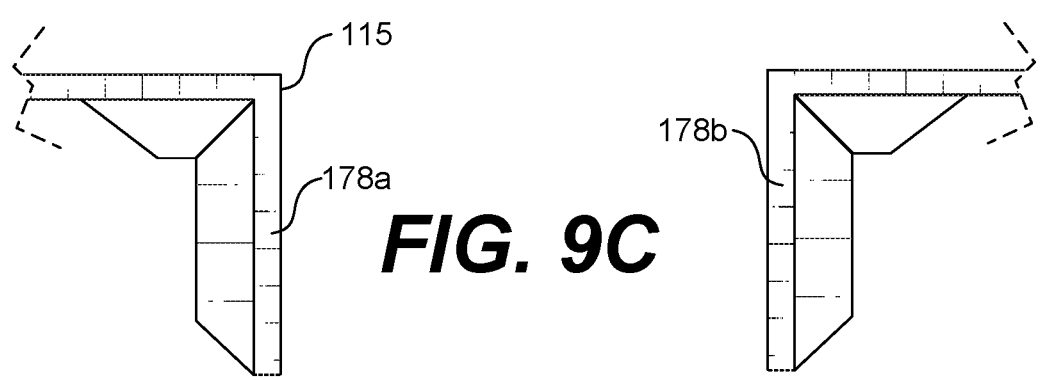
Figure 9D:
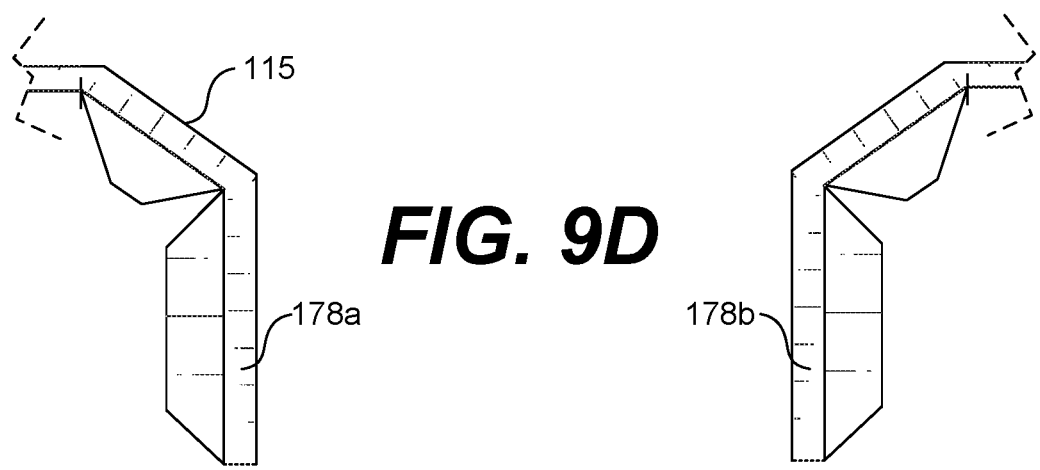

Referring next to FIG. 8, another front elevation view of the item stabilizer tray 100 of FIG. 1 is shown according to various embodiments. The perforations 136 of the item stabilizer tray 100, such as the first perforation 136a shown in FIG. 8, may include a multitude of small holes or cuts in a surface of the item stabilizer tray 100 to aid in an intentional collapse of the lip 115. For instance, when a sufficiently sized and weighted item 175 is placed on the first perforation 136a, the first perforation 136a will tear and the portion of the lip 115 above the first notched-out region 118 will collapse about the torn perforation 136a.

In some embodiments, the portion of the lip 115 above the first notched-out region 118 will be torn or otherwise dismembered into two members 178a, 178b (collectively "members 178"). For instance, a collapsed portion of the lip 115 (e.g., members 178) will wrap around one or more sides of the item 175 placed thereon, creating a sufficient coupling that prevents the item 175 from being shifted when lateral forces are acted upon the item 175, such as when a conveyor conveying the item 175 abruptly starts and/or abruptly stops.

While only the first lip support region 124 is shown in FIG. 8, it is understood that the same may apply to the second lip support region 127. The intentional collapse of the first lip support region 124 and/or the second lip support region 127 may be aided by the triangular-shaped indents 130a . . . 130n (collectively "triangular-shaped indents 130") in the first lip support region 124 and the second lip support region 127.

It is understood that, other ones of the triangular-shaped indents 130 may buckle or bend, further conforming the members 178 to the shape of the item 175. For instance, the item 175 or other article may include a cylindrical item, such as a protein powder container, beverage, bottled item, canned food, and the like. However, embodiments are not limited to these shapes of the item 175. For instance, the item stabilizer tray 100 may be beneficial in storing square or rectangular items, such as those without a weight sufficient of preventing shifting or otherwise moving during conveyance.

FIGS. 9A-9D illustrate a controlled deformation of the lip 115 in accordance with various embodiments. As noted above, in some embodiments, the item 175 may be placed in the item stabilizer tray 100 such that the item 175 contacts and/or rests against the top side contact surface 109 of the base 103. Additionally, the indents (e.g., the triangular-shaped indents 130) by virtue of their shape, may create a controlled deformation of the lip 115.

As noted above, when the perforation 136a above the central one of the triangular-shaped indents 130c tears or otherwise separates, a portion of the lip 115 may split into a first member 178a and a second member 178b. The first member 178a may have indents 130a, 130b with angles $\beta_1$, $\beta_2$, respectively. The second member 178b may have indents 130d, 130n with angles $\beta_3$, $\beta_4$, respectively.

For instance, in some embodiments, a first segment of the first member 178a may deform first before a second segment of the first member 178a bends downward. In other words, the first segment may fold, thereby decreasing angle $\beta_2$ until the angle $\beta_2$ reaches a predefined threshold. Thereafter, the second segment (or other downstream segment) folds downwards, causing the angle $\beta_1$ to decrease.

Similarly, a first segment of the second member 178b may deform first before a second segment of the second member 178b bends downward. In other words, the first segment of the second member 178b may fold decreasing angle $\beta_3$ until the angle $\beta_3$ reaches a predefined threshold. Thereafter, the next segment may fold afterwards, causing angle $\beta_4$ then decreases. To this end, angles between the indents may progressively shrink. When the angle is completely exhausted (e.g., $\beta_1=0°$) or is below a predetermined threshold (e.g., $\beta_1=10°$), a downstream indent will then deform. As such, a progress of failure is shown between the views of FIGS. 9A-9D.

Figure 10:
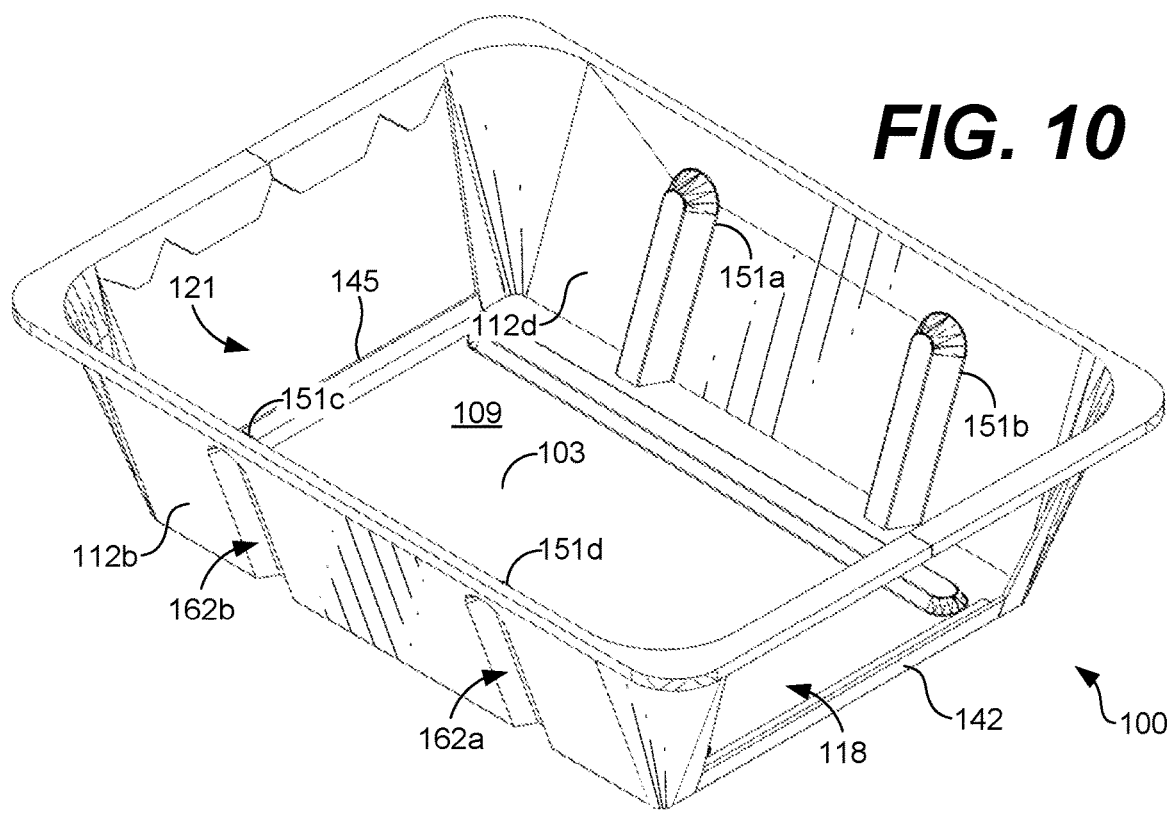
FIG. 10 is a top perspective view of a deformable item stabilizer tray in accordance with various embodiments of the present disclosure.
Figure 11:
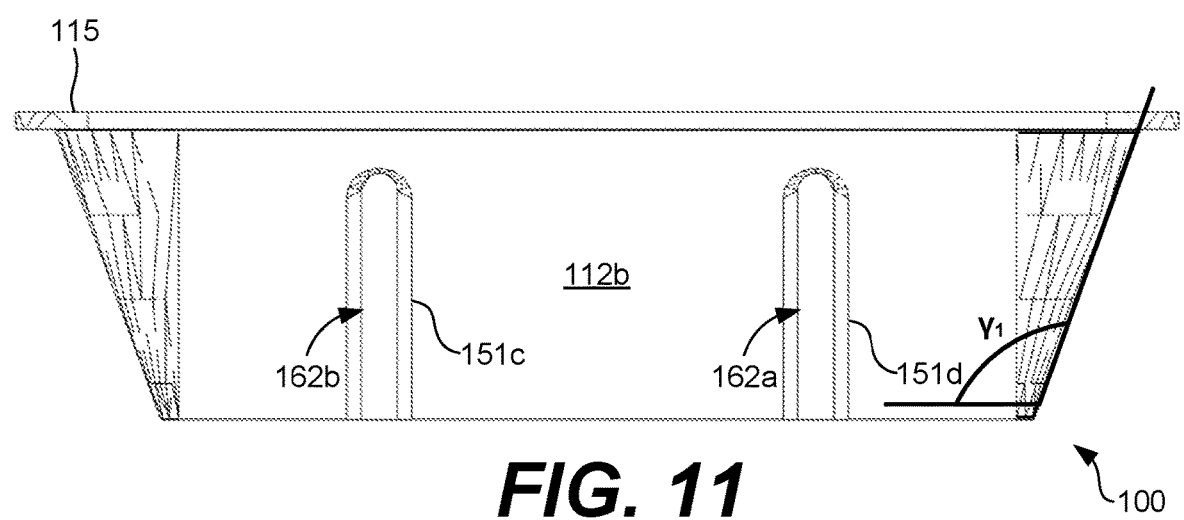
FIG. 11 is a side elevation view of the deformable item stabilizer tray of FIG. 10 in accordance with various embodiments of the present disclosure.

Referring now to FIGS. 10 and 11, a top perspective view of a deformable item stabilizer tray 100 and a side elevation view thereof are shown, respectively, in accordance with various embodiments of the present disclosure. The deformable item stabilizer tray 100 of FIGS. 10 and 11 may include the same general shape and components of the embodiment of FIGS. 1-5. However, the sidewall projections 151 of the item stabilizer tray of FIGS. 10 and 11 may define sidewall recesses 162a, 162b on outer surfaces of the sidewall 112 that extend vertically to the base 103.

To this end, it is understood that when multiple item stabilizer trays 100 are stacked, sidewall projections 151 of a first item stabilizer tray 100 may both slide and nest in the sidewall recesses 162 of a second item stabilizer tray 100, and base projections 148 of the first item stabilizer tray 100 may nest in base recesses 165 of the second item stabilizer tray 100. While the opposing side view of the deformable item stabilizer tray 100 of FIG. 11 is not shown, it is understood that the opposing side may include third and fourth sidewall recesses 162c, 162d. Further, a sidewall angle $\gamma_1$ of the sidewall 112 is shown in FIG. 11. In various embodiments, the sidewall angle is $\gamma_1$ approximately 110 degrees off a floor or 20 degrees off vertical, although other sidewall angles $\gamma_1$ may be employed.

In some embodiments, the item stabilizer tray 100, or any portion thereof, may be composed a lignocellulosic fibrous material, such as pulp paper. It is understood that the item stabilizing tray 100 being composed of pulp paper or other suitable material ensures a low unit cost while achieving curbside recyclability. In addition to or alternatively, the item stabilizer tray 100, or any portion thereof, may be composed of lightweight, recyclable, and deformable corrugated materials, plastic materials (e.g., PVC, ABS, and so forth), cardboard materials, paper materials, carbon fiber materials, and/or other suitable rigid or semi-rigid materials.

In embodiments in which the item stabilizer tray 100, or portions thereof, are formed of pulp paper, the pulp paper may be formed of softwood cellulose fibers, such as fibers obtained from spruce trees, pine trees, fir trees, larch trees, hemlock trees, and so forth. However, in alternative embodiments, the pulp paper may be formed of hardwood cellulose fibers, such as fibers obtains from *eucalyptus* trees, aspen trees, birch trees, and so forth. In some embodiments, fibers obtained from a genetically modified tree species, such as genetically modified *eucalyptus* or genetically modified poplar, may be employed. The pulp in the pulp paper may be obtained through mechanical, thermomechanical, chemical-thermomechanical, chemical, and/or recycled processes.

The item stabilizer tray 100 may be used in any suitable warehouse environment, supply chain distribution center, airport luggage system, custom-order manufacturing facility, or other suitable system, but various examples of the item stabilizer tray 100 are described herein for use with conveyance systems. For example, conveyance systems having belted and/or motor driven rollers. Various items 175 may be placed in the item stabilizer tray 100 before the items 175 are positioned on conveyance surfaces of the conveyance systems for conveyance of the items 175. For example, the item stabilizer tray 100 may be positioned between the conveyance surface and the item 175.

In various embodiments, multiple item stabilizer trays 100 may be stacked together and positioned, for example, next to a conveyance system for quick access by personnel conveying items 175 along a conveyor system. One of the item stabilizer trays 100 may be removed from the stack and attached to an item 175 (e.g., a curved item, such as a cylinder) along the length of the item 175. The item stabilizer tray 100 with the item 175 stored therein can be positioned on a conveyance surface of the conveyance system, such that the item stabilizer tray 100 is between the conveyance surface and the item 175. The bottom side contact surface 106 may contact the conveyance surface and the rigidity of the item stabilizer tray 100 may resist rolling of the item 175 while the item 175 is being conveyed by the conveyance system. After conveyance, and while the item 175 is still stored in the item stabilizer tray 100, the item 175 and/or the item stabilizer tray 100 may be packed in a box and/or container for further processing. However, the item 175 and the item stabilizer tray 100 may be separated before the item 175 and/or the item stabilizer tray 100 are packed in the box and/or container, such that the item stabilizer tray 100 may be recycled or reused.

In various embodiments, the item stabilizer tray 100 may include one or more strengthening features. For instance, the strengthening features may increase the rigidity of the item stabilizer tray 100, or portions thereof, and/or aid in resisting the rolling of the item 175 when the item 175 is placed in the item stabilizer tray 100. Layers and/or sections may include strengthening members, including but not limited to, multiple materials, strengthening members, and/or any features suitable for strengthening the item stabilizer tray 100 or portions thereof. These strengthening features can extend a portion or the whole width and/or height of the item stabilizer tray 100. For example, a strengthening features can extend along the width direction from one edge of the item stabilizer tray 100 to an opposing edge.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although relative terms, such as "on," "below," "upper," and "lower," are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on the structure, that the structure is "directly" disposed on the structure, or that the structure is "indirectly" disposed on the structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," "third," etc. are used only as illustrative labels, rather than a limitation for a number of the objects. It is understood that if multiple components are shown, the components may be referred to as a "first" component, a "second" component, and so forth, to the extent applicable. Additionally, should only a subset of the components be claimed, it is understood that a "second" component described in the specification may be referred to as a "first component" in the claims, and so forth.

Recitation of ranges of values herein are merely intended to serve as shorthand for referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better describe example embodiments of the disclosure, and does not pose a limitation on the scope of the disclosure unless otherwise claimed.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A deformable item stabilizer tray, comprising:
a rectangular base adapted to support an article, the rectangular base having a bottom side contact surface configured to maintain friction with a conveyor;
a plurality of sidewalls surrounding and extending at an angle from the rectangular base, the sidewalls contacting a lip having an outer peripheral extent;
a first notched-out region in a first one of the sidewalls defining a first lip support region, the first lip support region having a first plurality of indents configured to control a deformation of the lip above the first lip support region; and
a second notched-out region in a second one of the sidewalls defining a second lip support region, the second lip support region having a second plurality of indents configured to control a deformation of the lip above the second lip support region, the first notched-out region and the second notched-out region being on opposite ones of the sidewalls;
a first perforation through the lip above the first notched-out region;
a second perforation through the lip above the second notched-out region;
wherein, when the first perforation is separated, the lip above the first notched-out comprises a first member and a second member, the first member and the second member each comprising at least a first segment and a second segment;
wherein the first segment of the first member is configured to fold downwards until an angle between the first member reaches a predefined threshold and, thereafter, the second segment of the first member is configured to fold downwards;
wherein the first segment of the second member is configured to fold downwards until an angle between the first member reaches a predefined threshold and, thereafter, the second segment of the second member is configured to fold downwards.

2. The deformable item stabilizer tray according to claim 1, wherein:
the first plurality of indents are a first plurality of triangular-shaped indents;
a central one of the first plurality of triangular-shaped indents has an apex positioned directly underneath the first perforation;
a second plurality of indents are a second plurality of triangular-shaped indents; and
a central one of the second plurality of triangular-shaped indents has an apex positioned directly underneath the second perforation.

3. The deformable item stabilizer tray according to claim 1, wherein:
the first notched-out region further defines a first notched-region base positioned underneath the first notched-out region that contacts adjacent ones of the sidewalls, the first notched-region base having a rectangular shape and comprising a third perforation and a fourth perforation through opposing distal ends of the first notched-region base; and
the second notched-out region further defines a second notched-region base positioned underneath the second notched-out region that contacts adjacent ones of the sidewalls, the second notched-region base having a rectangular shape and comprising a fifth perforation and a sixth perforation through opposing distal ends of the second notched-region base.

4. The deformable item stabilizer tray according to claim 1, wherein:
the rectangular base comprises a top side contact surface configured to contact the article;
the rectangular base comprises a first elongated base projection and a second elongated base projection extending along a longitudinal axis of the rectangular base; and
other ones of the sidewalls not comprising the first notched-out region and the second notched-out region comprise a first elongated sidewall projection and a second elongated sidewall projection.

5. A deformable tray, comprising:
a base adapted to support an article;
a plurality of sidewalls surrounding and extending from the base, the sidewalls extending into a lip;
a first notched-out region in a first one of the sidewalls defining a first lip support region, the first lip support region having at least one indent configured to control a deformation of the lip above the first lip support region;
a perforation through the lip above the first notched-out region, the perforation being configured to separate the lip above the first notched-out region to form a first member and a second member, the first member and the second member being configured to fold downwardly for supporting the article; and
a second notched-out region in a second one of the sidewalls defining a second lip support region, the second lip support region having at least one indent configured to control a deformation of the lip above the second lip support region, the first notched-out region and the second notched-out region being on opposite ones of the sidewalls.

6. The deformable tray according to claim 5, wherein the sidewalls extend at an angle from the base such that a width between bottoms of the sidewalls adjacent to the base is less than a width between tops of the sidewalls.

7. The deformable tray according to claim 5, wherein the perforation is a first perforation and the deformable tray further comprises:
a bottom side contact surface of the base that is configured to maintain friction with a conveyor; and
a second perforation through the lip above the second notched-out region.

8. The deformable tray according to claim 7, wherein:
the first lip support region comprises a first plurality of indents, one of the first plurality of indents having an apex positioned underneath the first perforation; and
the second lip support region comprises a second plurality of indents, one of the second plurality of indents having an apex positioned underneath the second perforation.

9. The deformable tray according to claim 8, wherein:
each indent of the first plurality of indents and the second plurality of indents is triangular-shaped;
the one of the first plurality of indents having the apex positioned underneath the first perforation is a central one of the first plurality of indents; and
the one of the second plurality of indents having the apex positioned underneath the second perforation is a central one of the second plurality of indents.

10. The deformable tray according to claim 8, wherein:
the first notched-out region further defines a first notched-region base comprising a first portion of material positioned underneath the first notched-out region that contacts adjacent ones of the sidewalls and the base; and
the second notched-out region further defines a second notched-region base comprising a second portion of material positioned underneath the second notched-out region that contacts adjacent ones of the sidewalls and the base.

11. The deformable tray according to claim 10, wherein:
the first notched-region base comprises a rectangular shape;
the second notched-region base comprises a rectangular shape;
the first notched-region base comprises a third perforation and a fourth perforation located on opposing distal ends of the first notched-region base at a location where the first notched-region base contacts the sidewalls; and the second notched-region base comprises a fifth perforation and a sixth perforation located on opposing distal ends of the second notched-region base at a location where the second notched-region base contacts the sidewalls.

12. The deformable tray according to claim 10, further comprising:
   a plurality of base projections positioned on the base, the plurality of base projections extending along a longitudinal axis of the base; and
   a plurality of sidewall projections on an inner surface of a third one and a fourth one of the plurality of sidewalls, the third one and the fourth one of the sidewalls opposing one another extending along a normal axis of the third one and the fourth one of the sidewalls, respectively.

13. The deformable tray according to claim 12, wherein:
   the plurality of sidewall projections protrude inwards towards a tray interior, and the sidewall projections define sidewall recesses on outer surfaces of the sidewalls; and
   the plurality of base projections protrude upwards towards the tray interior, and the plurality of base projections define base recesses on the bottom side contact surface of the base.

14. The deformable tray according to claim 5, wherein the deformable tray is composed of a lignocellulosic fibrous material.

15. The deformable tray according to claim 14, wherein the lignocellulosic fibrous material is a pulp paper material.

16. A method, comprising:
   providing a deformable item stabilizer tray, comprising:
      a base adapted to support an article;
      a plurality of sidewalls surrounding and extending from the base, the sidewalls contacting a lip;
      a first notched-out region in a first one of the sidewalls defining a first lip support region, the first lip support region having at least one indent configured to control a deformation of the lip above the first lip support region;
      a perforation through the lip above the first notched-out region, the perforation being configured to separate the lip above the first notched-out region to form a first member and a second member, the first member and the second member being configured to fold downwardly for supporting the article; and
      a second notched-out region in a second one of the sidewalls defining a second lip support region, the second lip support region having at least one indent configured to control a deformation of the lip above the second lip support region, the first notched-out region and the second notched-out region being on opposite ones of the sidewalls;
   positioning the article on at least a portion of the lip that causes at least one of the first lip support region and the second lip support region to deform, thereby collapsing a respective portion of the lip; and
   placing the deformable item stabilizer tray having the article positioned therein on a conveyor system.

17. The method according to claim 16, wherein the sidewalls extend at an angle from the base such that a width between bottoms of the sidewalls adjacent to the base is less than a width between tops of the sidewalls.

18. The method according to claim 16, wherein the perforation is a first perforation and the deformable item stabilizer tray further comprises:
   a bottom side contact surface of the base that is configured to maintain friction with the conveyor system; and
   a second perforation on the lip above the second notched-out region.

19. The method according to claim 18, wherein:
   the first lip support region comprises a first plurality of indents, one of the first plurality of indents having an apex positioned underneath the first perforation; and
   the second lip support region comprises a second plurality of indents, one of the second plurality of indents having an apex positioned underneath the second perforation.

20. The method according to claim 19, wherein:
   each indent of the first plurality of indents and the second plurality of indents is triangular-shaped;
   the one of the first plurality of indents having the apex positioned underneath the first perforation is a central one of the first plurality of indents;
   the one of the second plurality of indents having the apex positioned underneath the second perforation is a central one of the second plurality of indents
   the first notched-out region further defines a first notched-region base comprising a first portion of material positioned underneath the first notched-out region that contacts adjacent ones of the sidewalls and the base; and
   the second notched-out region further defines a second notched-region base comprising a second portion of material positioned underneath the second notched-out region that contacts adjacent ones of the sidewalls and the base.

* * * * *